(12) United States Patent
Sawai

(10) Patent No.: US 9,952,424 B2
(45) Date of Patent: Apr. 24, 2018

(54) IMAGE PROJECTION APPARATUS

(71) Applicant: Konica Minolta, Inc., Tokyo (JP)

(72) Inventor: Yasumasa Sawai, Yamatotakada (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/119,333

(22) PCT Filed: Feb. 27, 2015

(86) PCT No.: PCT/JP2015/055780
§ 371 (c)(1),
(2) Date: Aug. 16, 2016

(87) PCT Pub. No.: WO2015/129849
PCT Pub. Date: Sep. 3, 2015

(65) Prior Publication Data
US 2017/0010459 A1    Jan. 12, 2017

(30) Foreign Application Priority Data

Feb. 27, 2014 (JP) .................................. 2014-036153

(51) Int. Cl.
*G02B 26/00* (2006.01)
*G02B 26/08* (2006.01)
(Continued)

(52) U.S. Cl.
CPC .......... *G02B 26/0833* (2013.01); *G02B 26/02* (2013.01); *G02B 26/08* (2013.01);
(Continued)

(58) Field of Classification Search
CPC .... G02B 26/0833; G02B 26/02; G02B 26/08; H04N 5/74; H04N 5/7458; H04N 9/3105; H04N 9/3114; H04N 9/3152
(Continued)

(56) References Cited

U.S. PATENT DOCUMENTS

| 5,442,414 A | 8/1995 | Janssen et al. |
| 6,773,120 B2 | 8/2004 | Colpaert |

(Continued)

FOREIGN PATENT DOCUMENTS

| JP | 2011-133530 A | 7/2011 |
| JP | 2011-521792 A | 7/2011 |

OTHER PUBLICATIONS

International Search Report issued in PCT/JP2015/055780 dated May 19, 2015 (1 page).

(Continued)

*Primary Examiner* — William Choi
(74) *Attorney, Agent, or Firm* — Osha Liang LLP

(57) ABSTRACT

In a reflection-type image display for use in an image projection apparatus, when normal vectors of a pixel reflection surface in image display and non-display states are VA and VB, respectively, a Y axis is set in a normal direction of an image display surface with the pixel center as an origin, an X axis is set in a direction perpendicular to the Y axis and the normal vector VA, and a projection of the vector VB onto an XY plane is vb, the projection vb is at a predetermined angle not parallel to the Y axis, and among projections of illumination light incident on the pixel reflection surfaces onto the XY plane, a projection forming a maximum angle with respect to the Y axis exists only on a side with respect to the Y axis where a region in which the projection vb exists lies.

12 Claims, 12 Drawing Sheets

(51) Int. Cl.
*H04N 5/74* (2006.01)
*H04N 9/31* (2006.01)
*G02B 26/02* (2006.01)

(52) U.S. Cl.
CPC ............ *H04N 5/74* (2013.01); *H04N 5/7458* (2013.01); *H04N 9/3105* (2013.01); *H04N 9/3114* (2013.01); *H04N 9/3152* (2013.01)

(58) Field of Classification Search
USPC .............................. 359/649–651, 290, 292
See application file for complete search history.

(56) References Cited

U.S. PATENT DOCUMENTS

| | | | |
|---|---|---|---|
| 2005/0254116 A1* | 11/2005 | Ishii | G02B 26/0841 359/291 |
| 2007/0257870 A1 | 11/2007 | Knipe | |
| 2009/0268270 A1 | 10/2009 | Keyworth et al. | |

OTHER PUBLICATIONS

Written Opinion of the International Searching Authority issued in PCT/JP2015/055780 dated May 19, 2015 (4 pages).
Fingas, J., "TI intros DLP pica projector chipset based on its Tilt & Roll Pixel technology," Sep. 6, 2013 (7 pages), retrieved from Engadget.com [online]: <URL:http://www.engadget.com/2013/09/06/ti-launches-dlp-pico-projector-chipset-based-on-tilt-and-roll/>.
Atarashi, Y., "Technology of DMD DLP," in Light Edge No. 21 (2001),; Dec. 20, 2000 (12 pages) retrieved from Ushio [online]: <URL:http://www.ushio.co.jp/documents//technology/lightedge/lightedge_21/ushio_le21-09.pdf>.

\* cited by examiner

DP (MR:OFF)

IMAGE PROJECTION APPARATUS

The present U.S. patent application is a U.S. national phase application under 35 U.S.C. 371 of International Application PCT/JP2015/055780 filed on Feb. 27, 2015. This application claims a priority under the Paris Convention of Japanese Patent Application No. 2014-036153 filed on Feb. 27, 2014, the entirety of which is incorporated herein by reference.

TECHNICAL FIELD

The present invention relates to an image projection apparatus, and specifically relates to an image projection apparatus equipped with a reflection-type image display element such as a digital micromirror device.

BACKGROUND ART

As reflection-type image display elements for use in projectors, there are known digital micromirror devices. A digital micromirror device has a picture display surface composed of a plurality of micromirrors, which are minute mirrors; it controls the tilt of each mirror surface on the image display surface, thereby modulates the intensity of illumination light, and thereby forms an image. That is, in a digital micromirror device, the turning on and off of each pixel is achieved, for example, by the rotation of a mirror surface through ±12° about a rotation axis disposed at 45° to each side of the image display surface. As for the movement of the micromirrors, Nonpatent Literature 1 listed below proposes a digital micromirror device of a new operation type.

With a reflection-type image display element such as a digital micromirror device, there occurs unnecessary light called OFF light, which is not used to form a projection image. The OFF light causes degradation of contrast in the projection image. More specifically, illumination light travels through a gap formed by the micromirrors tilted in an OFF state, and sneaks into a mirror back surface side, where the illumination light is irregularly reflected to become stray light, which causes contrast degradation. Nonpatent Literature 2 listed below describes covering the micromirror back surface side with a black oxide film in order to reduce the occurrence of such stray light. Furthermore, as methods for improving the contrast, Patent Literature 1 proposes shifting an angle of illumination light and using a noncircular aperture stop, and Patent Literature 2 proposes using a stop having an aperture elongated in a pixel tilt axis direction.

CITATION LIST

Patent Literature

Patent Literature 1: U.S. Pat. No. 6,773,120
Patent Literature 2: U.S. Pat. No. 5,442,414

Nonpatent Literature

Nonpatent Literature 1: TI intros DLP pico projector chipset based on its Tilt & Roll Pixel technology, Internet <URL: http://www.engadget.com/2013/09/06/ti-launches-dlp-pico-projector-chipset-based-on-tilt-and-roll/>

Nonpatent Literature 2: USHIO INC. 'Lightedge' No. 21, Technology of DMD·DLP, internet <URL: http//www.ushio.co.jp/documents/technology/Lightedge/Lightedge_21/ushio_Le21-09.pdf>

In a direction in which illumination light angle is shifted as proposed in Patent Literature 1, it is easy for the illumination light to sneak into a mirror back surface side. With the configuration proposed in Patent Literature 2, it is impossible to effectively prevent the illumination light from sneaking into the mirror back surface side. Besides, it is impossible to deal with a digital micromirror device of a new operation type with any of conventionally know measures, and even with the configuration described in Nonpatent Literature 2, it is impossible to sufficiently reduce the occurrence of stray light. The digital micromirror device of the new operation type disclosed in Nonpatent Literature 1 is configured such that ON light and OFF light can be further separated from each other, which helps achieve improved contrast, but it suffers more from the illumination light sneaking into the mirror back surface side to be reflected thereon.

SUMMARY

One or more embodiments of the present invention provide an image projection apparatus capable of performing high-contrast image display by reducing, in a reflection-type image display element, illumination light sneaking into a back surface side of a pixel reflection surface in an image non-display state.

According to one or more embodiments of the present invention, an image projection apparatus includes a reflection-type image display element that forms an image by modulating intensity of illumination light by causing, in an image display surface composed of a plurality of pixel reflection surfaces, each of the pixel reflection surfaces to switch between two angular states, which are an image display state and an image non-display state. Here, when a normal vector of the pixel reflection surfaces in the image display state is represented by VA, a normal vector of the pixel reflection surfaces in the image non-display state is represented by VB, a Y axis is set in a normal direction of the image display surface, with a pixel center as an origin, an X axis is set in a direction perpendicular to the Y axis and the normal vector VA, and a projection of the normal vector VB onto an XY plane is represented by vb, the projection vb is at a predetermined angle not parallel to the Y axis, and among projections of illumination light incident on the pixel reflection surfaces onto the XY plane, a projection that forms a maximum angle with respect to the Y axis exists only on a side with respect to the Y axis where a region in which the projection vb exists lies.

According to one or more embodiments of the present invention, an image projection apparatus includes a reflection-type image display element that forms an image by modulating intensity of illumination light by causing, in an image display surface composed of a plurality of pixel reflection surfaces, each of the pixel reflection surfaces to switch between two angular states, which are an image display state and an image non-display state. Here, when a normal vector of the pixel reflection surfaces in the image display state is represented by VA, a normal vector of the pixel reflection surfaces in the image non-display state is represented by VB, a Y axis is set in a normal direction of the image display surface, with a pixel center as an origin, an X axis is set in a direction perpendicular to the Y axis and the normal vector VA, and a projection of the normal vector VB onto an XY plane is represented by vb, the projection vb is at a predetermined angle not parallel to the Y axis, and when an illumination optical axis vector of illumination light incident on the pixel reflection surfaces is represented by VC, a projection of the vector VC onto the XY plane is represented by vc, an angle formed by the projection vb and the projection vc is represented by α, and an angle formed by the Y axis and the projection vb is represented by β, a relationship of α<β is satisfied.

According to one or more embodiments of the present invention, in the image projection apparatus described above, when a Z axis is set in a direction perpendicular to the X axis and the Y axis, a plane that includes an illumination optical axis of illumination light incident on the pixel reflection surfaces and the Z axis is represented by plane HD, a plane that includes the illumination optical axis and is perpendicular to the plane HD is represented by plane HE, an angular distribution width of illumination light within the plane HD is represented by γ, and an angular distribution width of illumination light within the plane HE is represented by δ, a relationship of γ>δ is satisfied.

According to one or more embodiments of the present invention, the image projection apparatus described above further includes an illumination system that guides illumination light to the image display surface, and a projection system that projects an image displayed on the image display surface.

According to one or more embodiments of the present invention, in the image projection apparatus described above, the illumination system includes an irregular-shaped aperture stop that has a noncircular shape and at least partly cuts such part of illumination light incident on the pixel reflection surfaces as is on a side with respect to the Y axis where the projection vb does not exist.

According to one or more embodiments of the present invention, in the image projection apparatus described above, the projection system includes an irregular-shaped aperture stop that is conjugate with, and similar in shape to, the irregular-shaped aperture stop of the illumination system.

According one or more embodiments of the present invention, an image projection apparatus includes a reflection-type image display element that forms an image by modulating intensity of illumination light by causing, in an image display surface composed of a plurality of pixel reflection surfaces, each of the pixel reflection surfaces to switch between two angular states, which are an image display state and an image non-display state. Here, a percentage of an amount of illumination light that sneaks into a back surface side of the pixel reflection surfaces with respect to an amount of illumination light incident on the pixel reflection surfaces is 17.5% or lower.

According to an image projection apparatus of one or more embodiments of the present invention, in a reflection-type image display element, illumination is so configured as to be able to reduce illumination light sneaking into the back surface side of pixel reflection surfaces in an image non-display state, and this helps reduce an amount of unnecessary light which becomes stray light, and thus makes it possible to achieve high-contrast display of images.

DESCRIPTION OF EMBODIMENTS

Embodiments and the like of image projection apparatus according to the present invention will be described below with reference to the accompanying drawings. Among different embodiments and the like, the same or equivalent parts are identified by the same reference signs, and no overlapping description will be repeated unless necessary.

As already mentioned above, in conventionally well-known digital micromirror devices, the turning ON/OFF of each pixel is achieved by, for example, the rotation of a mirror surface through ±12° about a rotation axis disposed at 45° to each side of the image display surface. In contrast, in a digital micromirror device of a new operation type (see, for example, Nonpatent Literature 1), the rotation of a mirror surface is not about one rotation axis. An image projection apparatus according to one or more embodiments of the present invention is related to an illumination configuration where illumination with respect to such a digital micromirror device of a new operation type is so performed as to achieve high-contrast display of images. Now, in order to describe advantages of such an illumination configuration, a description will first be given of a digital micromirror device of a new operation type.

Figure 2:
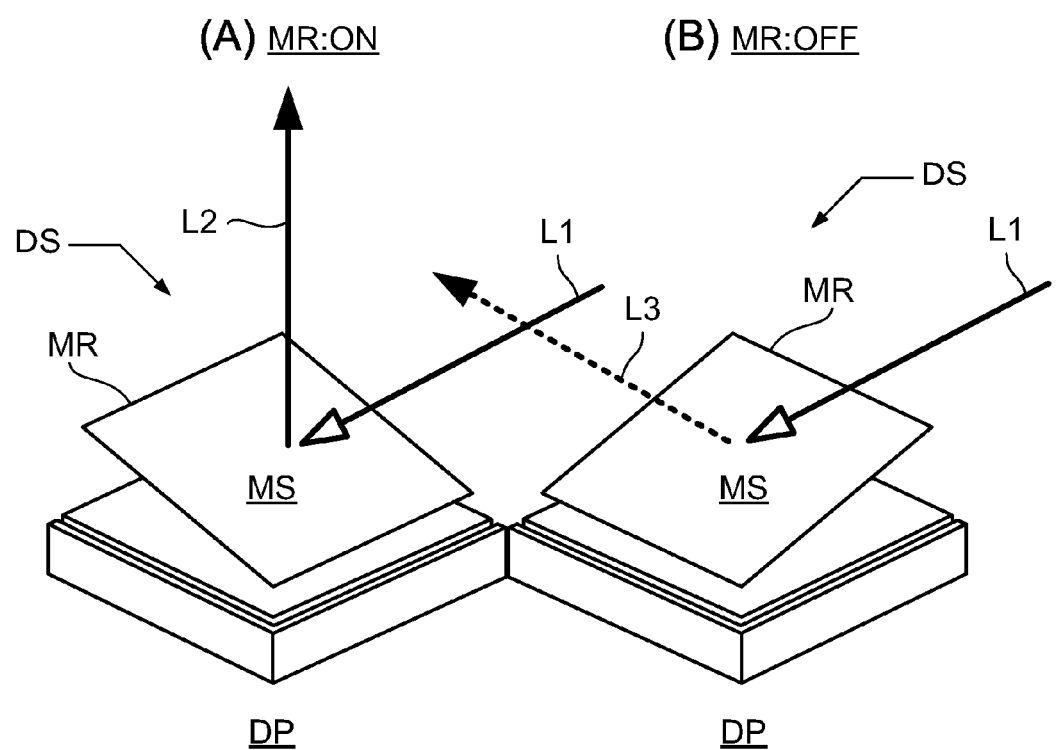
FIG. 2 is a schematic diagram for illustrating operation of a digital micromirror device of a new operation type.

FIG. 2 shows an ON state and an OFF state of a pixel constituted by a rectangular pixel reflection surface MS of a micromirror MR. The digital micromirror device DP is a reflection-type image display element that generates an image by modulating intensity of illumination light L1 by causing, in an image display surface DS composed of a plurality of pixel reflection surfaces MS, each of the pixel reflection surfaces MS to switch between two angular states, which are an image display state (ON state) and an image non-display state (OFF state). The pixel reflection surface MS of a micromirror MR is in the ON state when tilted to one side, and is in the OFF state when tilted to a side perpendicular to the one side. In generally conceivable ON/OFF control, when the pixel reflection surface MS is in the ON state, the illumination light L1 is incident on the micromirror MR so as to be reflected as projection light (ON light) L2 in a normal direction of the image display surface DS, and when the pixel reflection surface MS is in the OFF state, the illumination light L1 incident on the pixel reflection surface MS is reflected in a direction at a large angle with respect to the normal direction of the image display surface DS, and becomes OFF light (unnecessary light) L3. With this configuration, it is possible to form a desired image by modulating the intensity of the illumination light L1 by controlling the turning ON/OFF of the tilt of each micromirror MR. The image display surface DS is a plane that includes centers of all the pixel reflection surfaces MS.

Figure 3A:
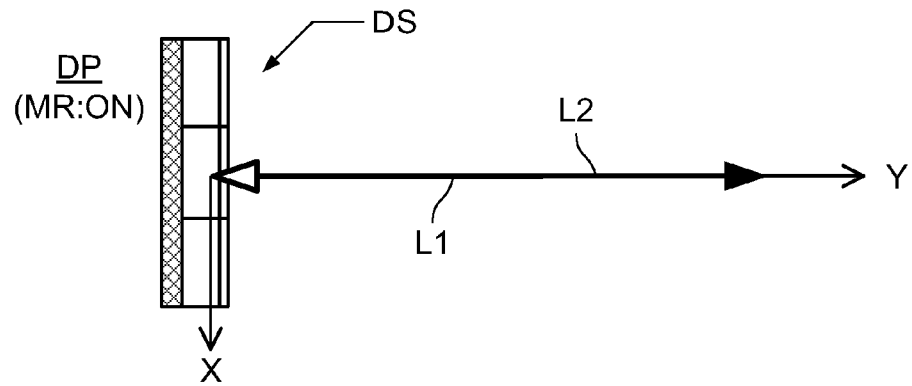
FIGS. 3A, 3B, and 3C are optical configuration diagrams showing a generally-conceivable ON state of pixel reflection surfaces in the digital micromirror device shown in FIG. 2.
Figure 3B:
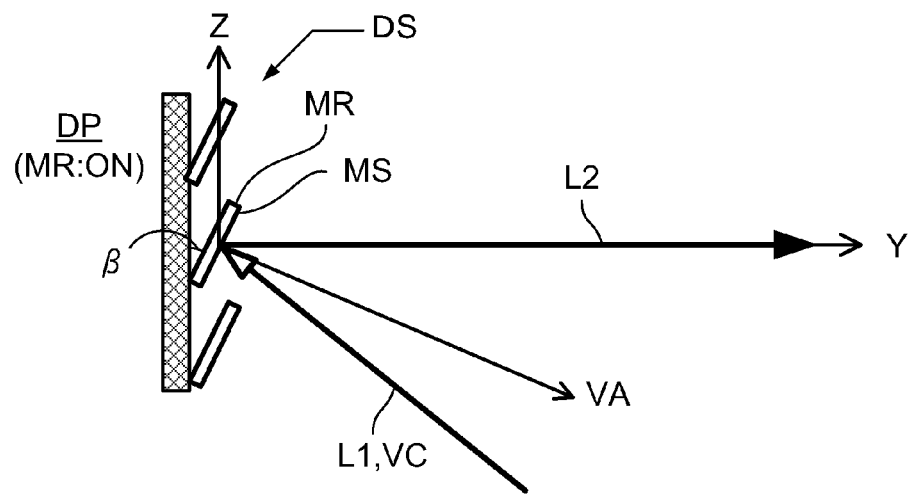
Figure 3C:
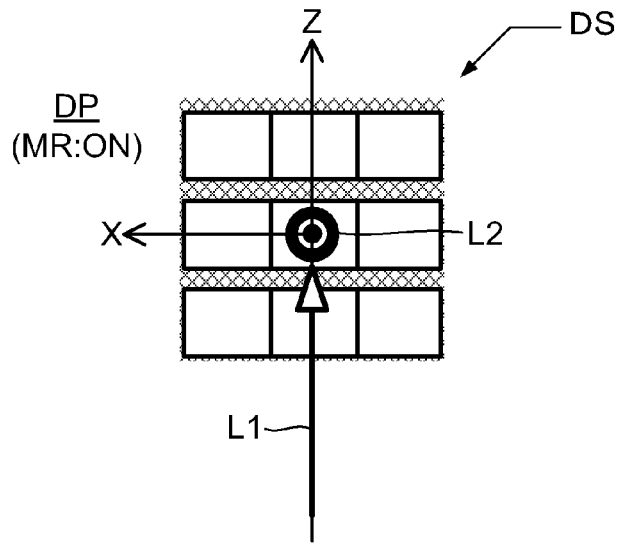
Figure 4:
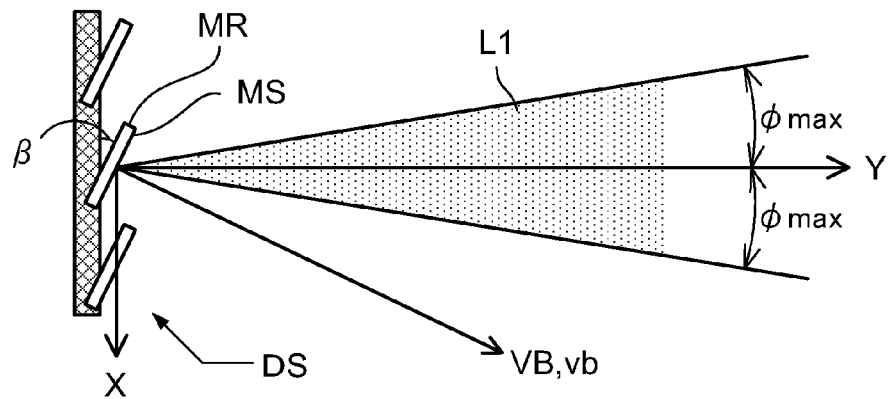
FIG. 4 is an optical configuration diagram showing a generally-conceivable OFF state of the pixel reflection surfaces in the digital micromirror device shown in FIG. 2.

FIGS. 3A, 3B, and 3C are a top view, a side view, and a front view, respectively, each showing the illumination light L1, the projection light L2, and the like when the micromirrors MR are in the ON state. FIG. 4 is a top view showing the illumination light L1 and the like when the micromirrors MR are in the OFF state. The ON and OFF states shown in these figures of FIGS. 3A to 3C and FIG. 4 are the ON and OFF states generally conceivable in digital micromirror devices DP of the new operation type (FIG. 2).

In FIGS. 3A, 3B, and 3C, and FIG. 4, a center of an image display surface DS is set as an origin (0, 0, 0), a Y axis is set in the normal direction of the image display surface DS, an X axis is set in a side-surface direction (a direction perpendicular to the Y axis and a normal vector VA), and a Z axis is set in an upward direction (a direction perpendicular to the X axis and the Y axis). When a tilt angle of a pixel reflection surface MS is represented by $\beta$, a normal vector of the pixel reflection surface MS in the ON state is represented by VA, and a normal vector of the pixel reflection surface MS in the OFF state is represented by VB, VA is represented by (0, $-\cos \beta$, $-\sin \beta$) and VB is represented by ($\sin \beta$, $-\cos (3, 0)$, and a projection vb of the normal vector VB onto an XY plane is represented by ($\sin \beta$, $-\cos (3, 0)$, and thus, the projection vb forms an angle $\beta$ with, and thus is not parallel to, the Y axis. As shown in FIGS. 3A, 3B, and 3C, a center of the illumination light L1 is generally illuminated from a direction of a vector (0, $-\cos 2\beta$, $\sin 2\beta$) such that a center of the projection light L2 travels in a direction of a vector (0, 1, 0). At this time, among projections of the illumination light L1 incident on the pixel reflection surface MS onto the XY plane, a projection that forms a maximum angle $\varphi$max with respect to the Y axis exists both in a region where X is positive and in a region where X is negative, in such a manner as to be symmetrical with respect to the Y axis as shown in FIG. 4.

Figure 1A:
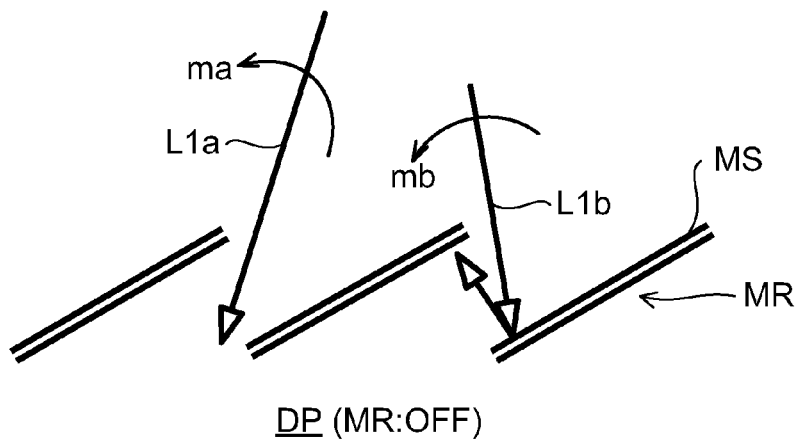
FIGS. 1A, 1B, and 1C are schematic diagrams for illustrating a cause of occurrence of stray light.

When, as described immediately above, among the projections of the illumination light L1, projections that each form the maximum angle $\varphi$max with respect to the Y axis exist in such a manner as to be symmetrical with respect to the Y axis (FIG. 4), with respect to the microimrrors MR in the OFF state and tilted as shown in FIG. 1A, an increased percentage of the illumination light L1a becomes directly incident on the back surface side of pixel reflection surfaces MS or an increased percentage of illumination light L1b becomes incident on the back surface side of the pixel reflection surfaces MS after being reflected on the pixel reflection surfaces MS, and such light becomes stray light and causes the degradation of contrast. Shifting incident directions of the illumination light L1a and L1b in directions indicated by arrows ma and mb, respectively, makes it difficult for the illumination light L1a and L1b to sneak into the back surface side of the pixel reflection surfaces MS. Here, the maximum angle $\varphi$max is defined as the maximum one of angles formed by an effective optical path, which is determined geometrically, and the Y axis, when the illumination light is viewed from a center of any given pixel.

Figure 5:
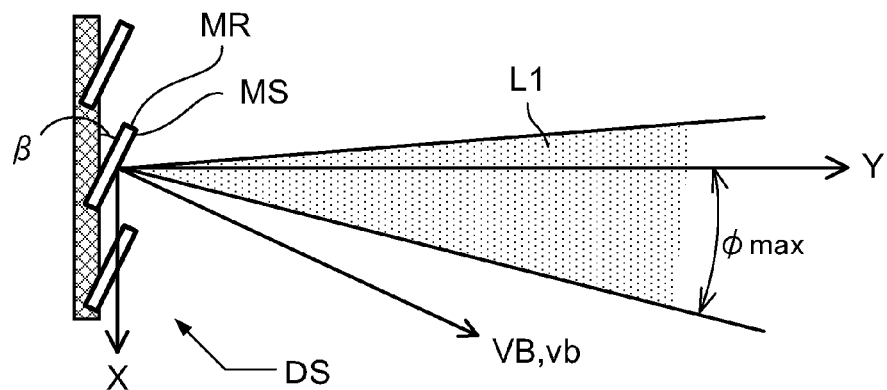
FIG. 5 is an optical configuration diagram showing a first-type illumination configuration with the pixel reflection surfaces in the OFF state.

FIG. 5 shows the OFF state of micromirrors MR in a first-type illumination configuration. In an image projection apparatus according to one or more embodiments of the present invention, as shown in FIG. 5, among the projections of the illumination light L1 incident on a pixel reflection surface MS onto the XY plane, a projection that forms the maximum angle $\varphi$max with respect to the Y axis exists only in the region where X is positive. That is, among the projections of the illumination light L1 incident on the pixel reflection surface MS onto the XY plane, a projection that forms the maximum angle $\varphi$max with respect to the Y axis exists only on a side with respect to the Y axis where a region in which the projection vb exists lies. This setting of the illumination direction helps lower the percentage of such part of the illumination light L1 as sneaks into the back surface side of the pixel reflection surfaces MS (the mirror back surface side) and becomes stray light, and thus makes it possible to improve the contrast.

Thus, in an image projection apparatus including a reflection-type image display element that forms an image by modulating intensity of illumination light by causing, in an image display surface composed of a plurality of pixel reflection surfaces, each of the pixel reflection surfaces to switch between two angular states, which are an image display state and an image non-display state, when a normal vector of the pixel reflection surfaces in the image display state is represented by VA, a normal vector of the pixel reflection surfaces in the image non-display state is represented by VB, a Y axis is set in a normal direction of the image display surface, with the pixel center as the origin, an X axis is set in the direction perpendicular to the Y axis and the normal vector VA, and the projection of the normal vector VB onto the XY plane is represented by vb, in a case where the projection vb forms a predetermined angle not parallel with respect to the Y axis, among the projections of the illumination light incident on the pixel reflection surfaces onto the XY plane, a projection that forms the maximum angle with respect to the Y axis exist only on a side with respect to the Y axis where a region in which the projection vb exists lies.

Figure 1B:
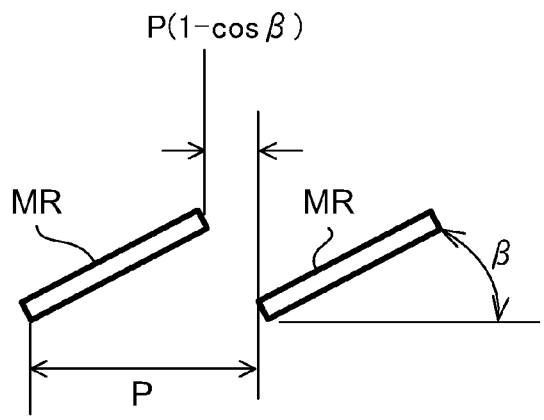
Figure 1C:
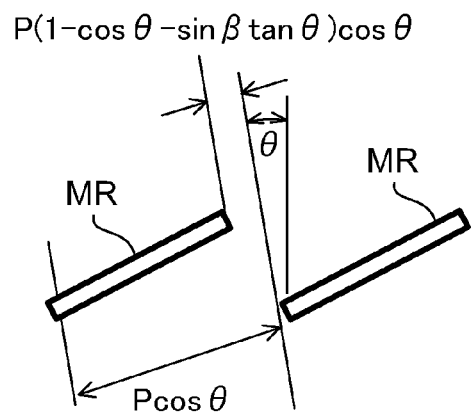

Here, when the illumination light L1 sneaks into the back surface side of a pixel reflection surfaces MS in the OFF state, the illumination light L1 passes through an opening gap between the micromirrors MR. Thus, a consideration will now be given to the relationship between the incident angle $\theta$ of the illumination light L1 on the XY plane and a proportion $\eta(\theta)$ of the opening gap between the micromirrors MR in the OFF state. Assume that the illumination light L1 is incident at the incident angle $\theta$ on the image display surface DS composed of the pixel reflection surfaces MS which are tilted at a tilt angle $\beta$ and arranged at a pixel pitch P. In a case where the incident angle $\theta$ is zero degrees as shown in FIG. 1B, the opening gap is $P(1-\cos \beta)$, and thus the following holds: the proportion $\eta(0)$ of the opening gap$=P(1-\cos \beta)/P=1-\cos \theta$. In a case where the illumination light L1 is incident from a direction tilted by the incident angle $\theta$ toward a pixel normal line as shown in FIG. 1C, the opening gap is $P(1-\cos \theta-\sin \beta \tan \theta)\cos \theta$, and thus the following holds: the proportion $\eta(\theta)$ of the opening gap=$P(1-\cos\beta-\sin\beta\tan\theta)\cos\theta/(P\cos\theta)=1-\cos\beta-\sin\beta\tan\theta=\eta(0)-\sin\beta\tan\theta<\eta(0)$.

As the incident angle $\theta$ of the illumination light L1 on the XY plane becomes larger, the proportion $\eta$ of the opening gap decreases through which the illumination light L1 can sneak into the back surface side of the pixel reflection surfaces MS in the OFF state. For illumination light coming from a direction tilted toward the pixel normal line (in a case of $\theta>0$), the proportion of the opening gap decreases through which the illumination light can sneak into the mirror back surface side; on the other hand, for illumination light coming from an opposite direction (in a case of $\theta<0$), the proportion increases. Thus, by tilting the illumination optical axis of illumination light in a direction such that the proportion of the opening gap through which the illumination light can sneak into the back surface side of the pixel reflection surfaces MS decreases as shown in FIG. 5, or, as will be described later, by blocking the illumination light L1 the incident angle $\theta$ of which is smaller than zero and for which the proportion of the opening gap is large, a smaller part of the illumination light L1 sneaks into the back surface side of the pixel reflection surfaces MS and becomes stray light, and thus to improve the contrast.

Figure 6A:
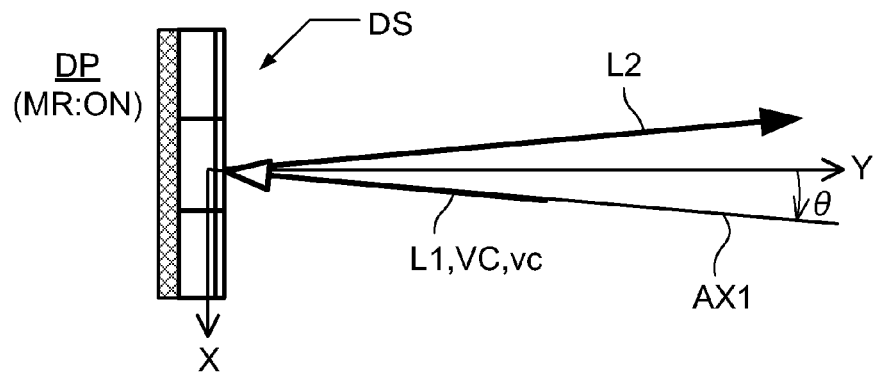
FIGS. 6A, 6B, and 6C are optical configuration diagrams showing a second-type illumination configuration with the pixel reflection surfaces in the ON state.
Figure 6B:
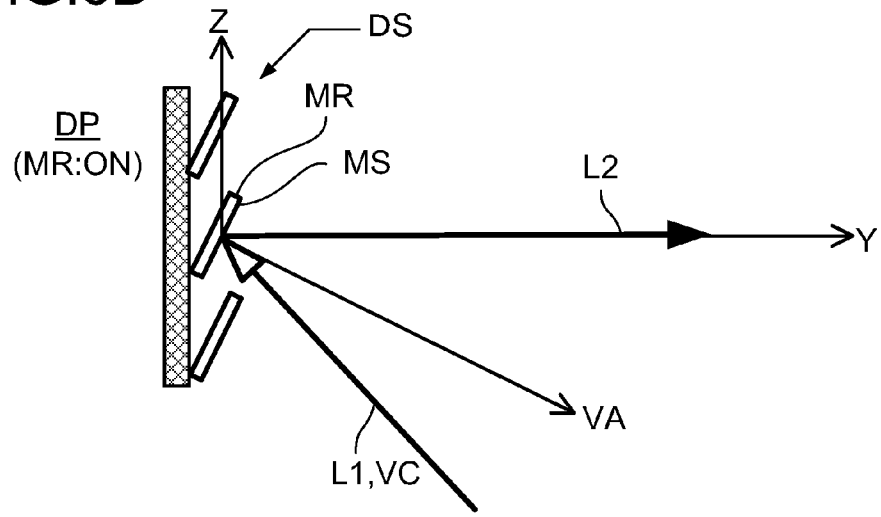
Figure 6C:
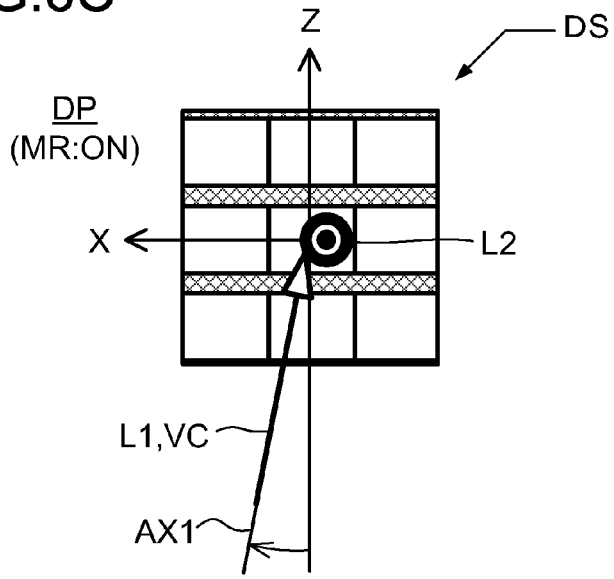
Figure 7A:
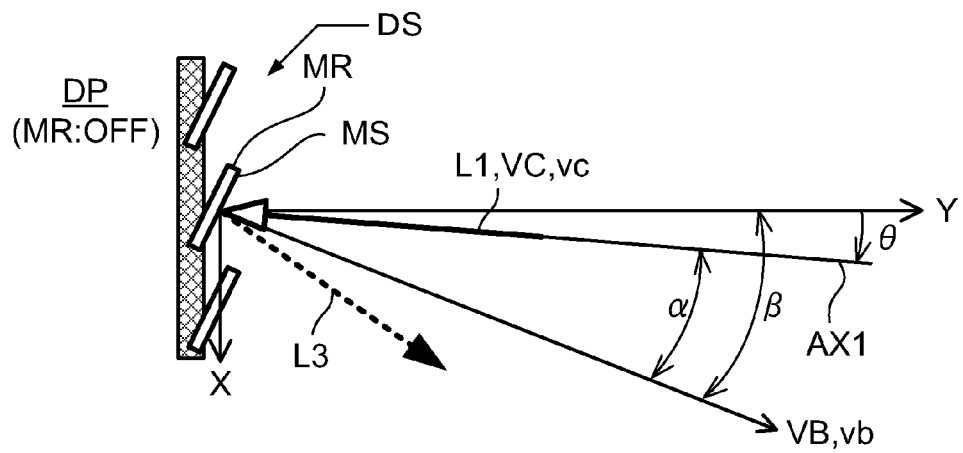
FIGS. 7A, 7B, and 7C are optical configuration diagrams showing the second-type illumination configuration with the pixel reflection surfaces in the OFF state.
Figure 7B:
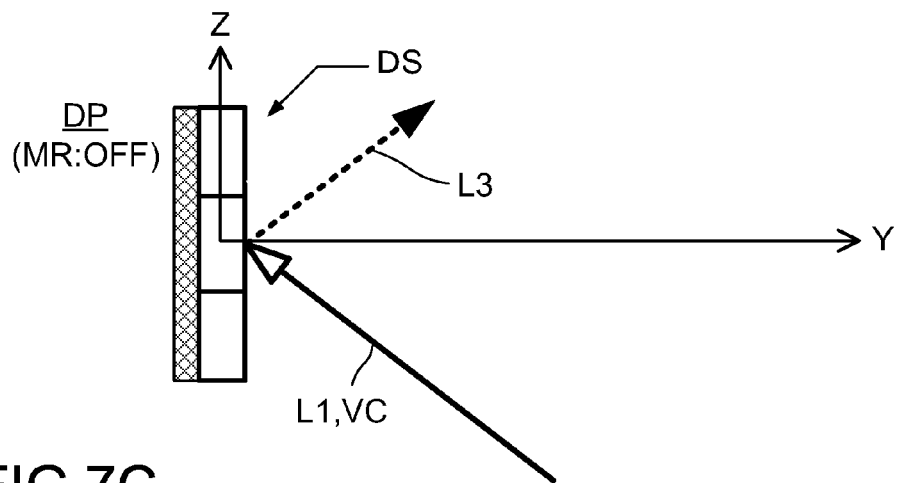
Figure 7C:
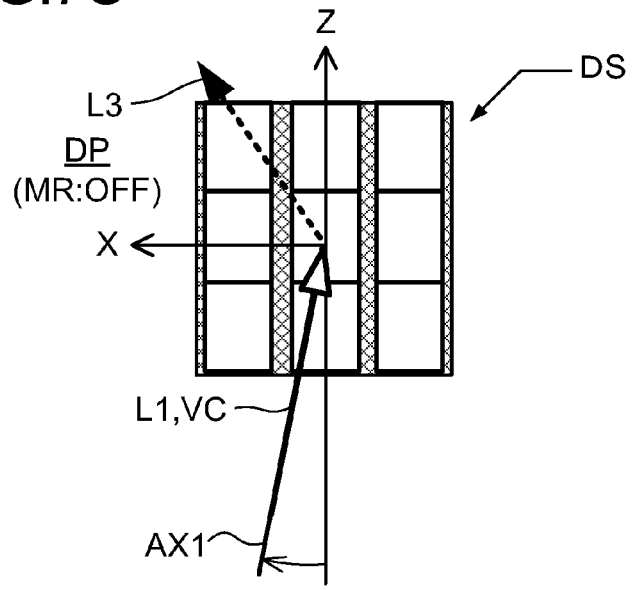

FIGS. 6A, 6B, and 6C show the ON state, and FIGS. 7A, 7B, and 7C show the OFF state, of the micromirrors MR in a second-type illumination configuration. FIGS. 6A, 6B, and 6C are a top view, a side view, and a front view, respectively, showing the illumination light L1, the projection light L2, etc. when the micromirrors MR are in the ON state. FIGS. 7A, 7B, and 7C are a top view, a side view, and a front view, respectively, showing the illumination light L1, the OFF light L3, etc. when the micromirrors MR are in the OFF state.

In the second-type illumination configuration, as shown in FIGS. 7A, 7B, and 7C, illumination is performed with the illumination optical axis AX1 shifted in a direction that makes it difficult for the illumination light L1 to sneak into the mirror back surface side. Here, the configuration is such that illumination is performed in the direction of a vector VC $(\cos 2\beta\cdot\sin\theta, -\cos 2\beta\cdot\cos\theta, \sin 2\beta)$ of the illumination optical axis AX1 shifted by an angle $-\theta$ around the Z axis. At this time, a projection vc of the vector VC onto the XY plane is $(\cos 2\beta\cdot\sin\theta, -\cos 2\beta\cdot\cos\theta, 0)$, and an angle $\alpha$ formed by the projection vb and the projection vc is equal to $\beta-0$, and thus is set such that a relationship of $\alpha<\beta$ is satisfied. By setting the illumination direction in this way, a smaller proportion of the illumination light L1 sneaks into the back surface side of the pixel reflection surfaces MS (the mirror back surface side) to become stray light, and thus it is possible to improve the contrast.

Thus, in an image projection apparatus including a reflection-type image display element that forms an image by modulating intensity of illumination light by causing, in an image display surface composed of a plurality of pixel reflection surfaces, each of the pixel reflection surfaces to switch between two angular states, which are an image display state and an image non-display state, when a normal vector of the pixel reflection surfaces in the image display state is represented by VA, a normal vector of the pixel reflection surfaces in the image non-display state is represented by VB, a Y axis is set in a normal direction of the image display surface, with a pixel center as an origin, an X axis is set in a direction perpendicular to the Y axis and the normal vector VA, and a projection of the normal vector VB onto an XY plane is represented by vb, in a case where the projection vb is at a predetermined angle not parallel to the Y axis, when an illumination optical axis vector of the illumination light incident on the pixel reflection surfaces is represented by VC, a projection of the vector VC onto the XY plane is represented by vc, an angle formed by the projection vb and the projection vc is represented by $\alpha$, and an angle formed by the Y axis and the projection vb (in other words, the tilt angle of the pixel reflection surfaces MS) is represented by $\beta$, the relationship of $\alpha<\beta$ be satisfied.

Figure 8A:
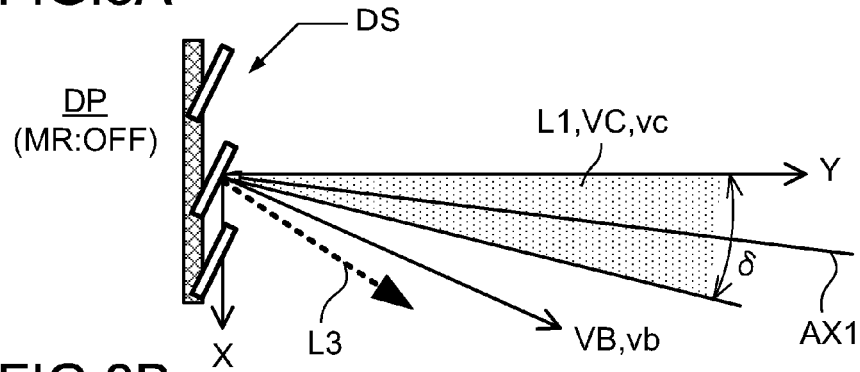
FIGS. 8A, 8B, and 8C are optical configuration diagrams showing a third-type illumination configuration with the pixel reflection surfaces in the OFF state.
Figure 8B:
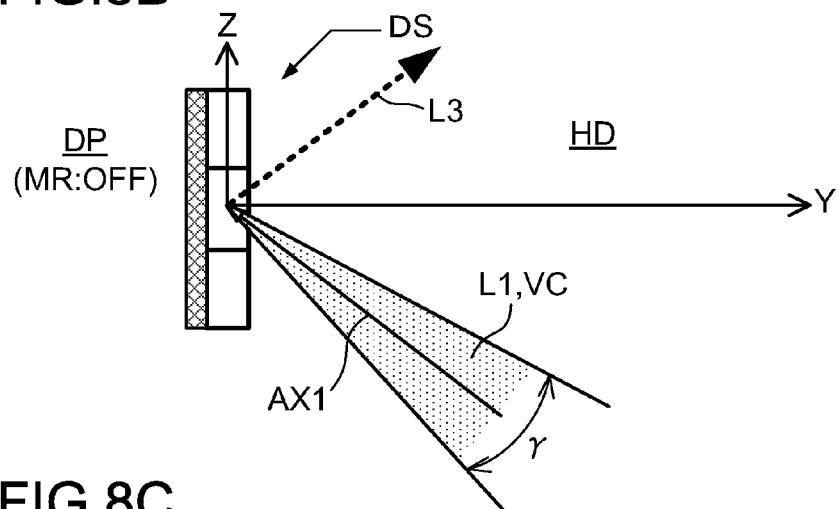
Figure 8C:
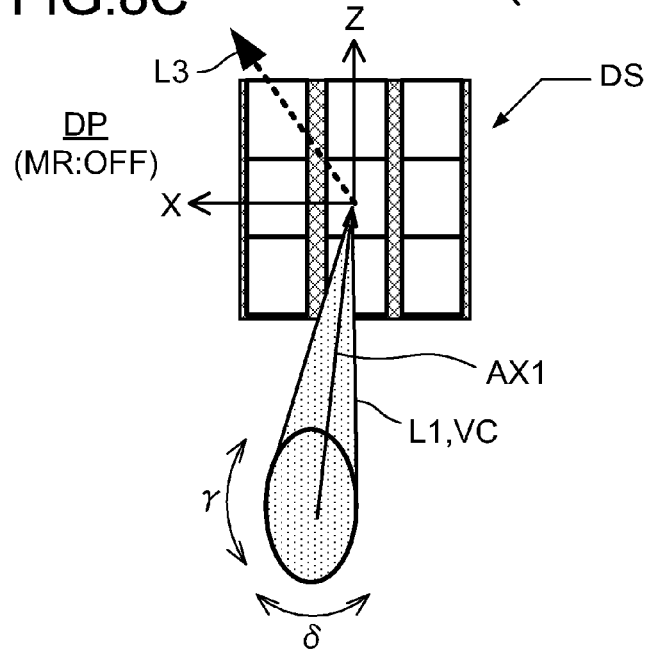

FIGS. 8A, 8B, and 8C show the OFF state of the micromirrors MR in a third-type illumination configuration. FIGS. 8A, 8B, and 8C are a top view, a side view, and a front view, respectively, showing the illumination light L1, the OFF light L3, and the like when the micromirrors MR are in the OFF state. In the third-type illumination configuration, as shown in FIGS. 8A, 8B, and 8C, illumination is performed with the illumination optical axis AX1 shifted in a direction that makes it difficult for the illumination light L1 to sneak into the mirror back surface side, and by flattening the angular distribution of the illumination light L1. That is, as shown in FIGS. 8A, 8B, and 8C, when the Z axis is set in a direction perpendicular to the X axis and the Y axis, a plane that includes the illumination optical axis AX1 of the illumination light L1 incident on the pixel reflection surfaces MS and the Z axis is represented by plane HD, a plane that includes the illumination optical axis AX1 and is perpendicular to the plane HD is represented by plane HE, an angular distribution width of the illumination light L1 within the plane HD is represented by $\gamma$, and an angular distribution width of the illumination light within the plane HE is represented by $\delta$, a relationship of $\gamma>\delta$ is satisfied.

For example, let an aperture, or rather an acceptance angle, of a projection lens 7 (FIG. 9) be 20° (−10° to +10°), and let $\gamma$ of the illumination light L1 be 20° (−10° to +10°). When $\delta$ is 20°, if the illumination optical axis AX1 is shifted by an angle $\theta$ of 2°, then $\gamma$ becomes 20° (−8° to +12°). The projection light beam L2 that enters the projection lens 7 when in the ON state has a distribution width of 20° (−10° to +10°) in a $\gamma$ direction, but has a distribution width of 20° (−12° to +8°) in a $\delta$ direction, and such part of the projection light beam L2 as is at an angle larger than 10° cannot pass through the projection lens 7. At this time, if $\delta$ is 16° (−6° to +10°), the incident angle on the projection lens 7 in the $\delta$ direction becomes 16° (−10° to +6°), and all the projection light beam L2 can pass through the projection lens 7.

Figure 9:
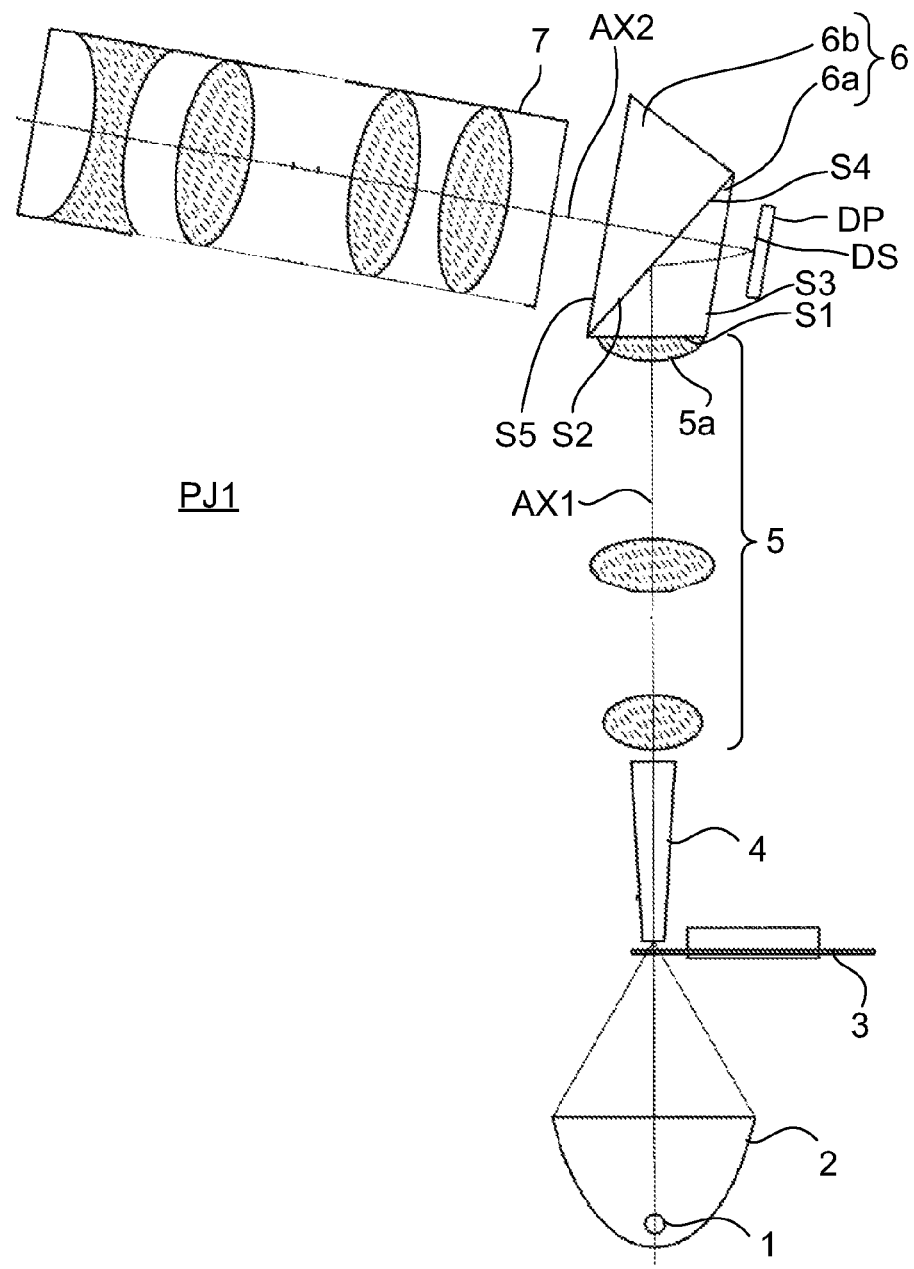
FIG. 9 is an optical configuration diagram showing an image projection apparatus having the third-type illumination configuration.
Figure 10A:
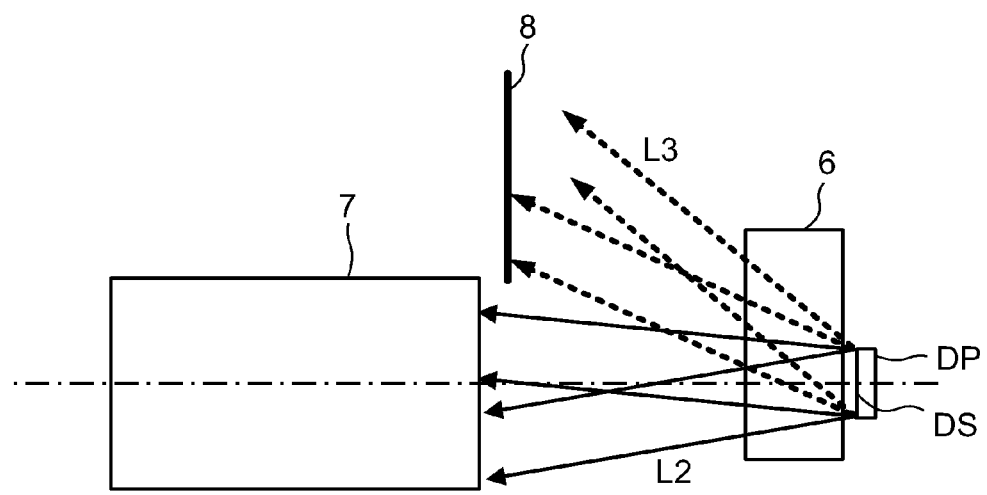
FIGS. 10A and 10B are schematic diagrams showing optical path processing and the like performed on OFF light in the third-type illumination configuration provided in the image projection apparatus shown in FIG. 9.
Figure 10B:
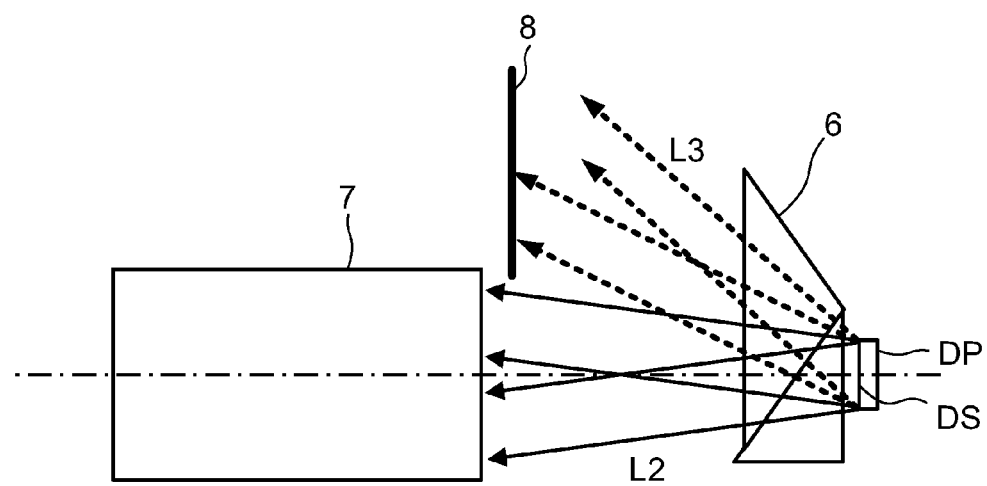

FIG. 9 shows an image projection apparatus PJ1 having the third-type illumination configuration (FIGS. 8A, 8B, and 8C) described just above, and FIGS. 10A and 10B, which are a top view and a side view, respectively, show optical path processing and the like performed on the OFF light in the third-type illumination configuration in the image projection apparatus PJ1. The image projection apparatus PJ1 shown in FIG. 9 includes a lamp light source 1, an illumination system formed with a reflector 2, a color wheel 3, a rod integrator 4, a relay optical system 5, and the like, an optical path separation system formed with a prism unit 6, a digital micromirror device DP, and a projection system formed with a projection lens 7, etc. In this arrangement, the illumination system guides the illumination light L1 to the image display surface DS of the digital micromirror device DP, and the prism unit 6 formed with a first prism 6a and a second prism 6b performs separation of the illumination light L1 and the projection light L2 such that the projection system projects an image displayed on the image display surface DS onto a screen surface in an enlarged scale.

In the image projection apparatus PJ1, a tapered-rod shaped rod integrator is used as the rod integrator 4 for the purpose of achieving illumination (flat illumination) where the illumination light L1 has a flat angular distribution. The lamp light source 1 is a discharge lamp that emits white light. The lamp reflector 2 has a reflection surface formed as an ellipsoid, and the lamp light source 1 is placed at a focal position of the ellipsoidal lamp reflector 2. Thus, a light beam from the lamp light source 1 is emitted as converged light. The converged light enters the color wheel 3. The color wheel 3 is formed with color filters that transmit color light of R (red) light, G (green) light, and B (blue) light. By rotating the color wheel 3, colors of illumination light are switched sequentially with time, and by displaying image information corresponding to each color on the digital micromirror device DP, it is possible to color a projection image.

The light beam that has passed through the color wheel 3 enters the rod integrator 4 made of glass formed in a shape of an elongated rectangular pillar in section. The light beam that has entered the rod integrator 4 through a light entrance surface of the rod integrator 4 is totally reflected repeatedly on wall surfaces of the rod integrator 4 to be mixed, such that the light beam has uniform energy distribution when it reaches a light exit surface of the rod integrator 4. Disposed behind the rod integrator 4 are the relay optical system 5, the prism unit 6, and the digital micromirror device DP, which is a reflection-type image display element. Illumination light that has exited the rod integrator 4 then passes through the relay optical system 5 and the prism unit 6, and illuminates the image display surface DS of the digital micromirror device DP. Among reflection light from the illuminated digital micromirror device DP, such reflection light as is reflected by the pixel reflection surfaces MS in the ON state enters the projection lens 7 and is projected onto the screen as the projection light L2. On the other hand, light reflected from the pixel reflection surfaces MS in the OFF state becomes OFF light L1, and does not enter the projection lens 7, and thus is not projected onto the screen. As a result, an image is projected and displayed on the screen.

The relay optical system 5 (including an entrance lens 5a attached to the first prism 6a) arranged between the rod integrator 4 and the prism unit 6 causes an image on the light exit surface of the rod integrator 4 to be projected onto the image display surface DS of the digital micromirror device DP, and performs uniform illumination. That is, the light exit surface of the rod integrator 4 is conjugate with the image display surface DS, and by forming the light exit surface of the rod integrator 4 in a shape substantially similar to that of the display area of the image display surface DS, efficient illumination is achieved. At this time, as shown in FIGS. 8A, 8B, and 8C, the illumination optical axis AX1 is set to be tilted in a direction in which the normal vector VB of the pixel reflection surface MS in the OFF state is tilted.

The light exit surface of the rod integrator 4 used here is formed in a rectangular shape that is substantially similar to the shape of the image display surface DS of the digital micromirror device DP, but the light entrance surface of the rod integrator 4 is formed in a substantially square shape, and the rod integrator 4 is tapered such that corresponding reflection surfaces are tilted. With the rod integrator 4 formed in such a shape, the angle of a light beam corresponding to a screen long-side direction with respect to the illumination optical axis AX1 becomes smaller each time the light beam is reflected, and the range of angular distribution in that direction becomes small. Thus, it is possible to obtain the illumination light beam L1 that has a flat angular distribution as shown in FIGS. 8A, 8B, and 8C. Here, the direction in which the range of angular distribution is caused to be small by the tapered shape of the tapered rod is a direction perpendicular to the direction in which the projection light and the illumination light are separated, but, for the sake of convenience, the directions are illustrated within the same sheet in FIG. 9.

The image of the lamp light source 1 is formed on the light entrance surface of the rod integrator 4, and a light beam distribution range at the light entrance surface is circular in shape. Thus, even if the shape of the light entrance surface of the rod integrator 4 is made closer to a square shape by narrowing its shape in the long-side direction, loss of light entering the rod integrator 4 is small. Further, even through the angle of the illumination optical axis AX1 is shifted, the angular width of the illumination light beam L1 is also reduced in the direction of the angular shift, an amount of light lost by being cut by the stop of the projection lens 7 is also small.

In the prism unit 6, the first prism 6a has a first light entrance surface S1, a critical surface S2, and a first light exit surface S3, and the second prism 6b has a second light entrance surface S4 and a second light exit surface S5. The critical surface S2 of the first prism 6a and the second light entrance surface S4 of the second prism 6b are arranged opposite each other with an air layer between them. Further, in order to produce telecentric illumination light, the entrance lens 5a is attached to the first light entrance surface S1 of the first prism 6a. The illumination light L1 travels through the entrance lens 5a to enter the first prism 6a through the first light entrance surface S1. The critical surface S2 of the first prism 6a is arranged so as to totally reflect the illumination light L1 incident thereon, and the illumination light L1 reflected by the critical surface S2 exits the first prism 6a through the first light exit surface S3, and illuminates the digital micromirror device DP.

ON light reflected by the pixel reflection surfaces MS in the ON state, namely the projection light L2, enters the first prism 6a again through the first light exit surface S3, and reaches the critical surface S2 of the first prism 6a. Since the projection light L2 is incident on the critical surface S2 at an angle that does not fulfill a condition for total reflection, it passes through the critical surface S2 and enters the second prism 6b through the second light entrance surface S4 via the air layer. Then, the projection light L2 exits the second prism 6b through the second light exit surface S5, enters the projection lens 7, and is projected onto the screen. On the other hand, OFF light reflected by the pixel reflection surfaces MS in the OFF state, namely the unnecessary light L3, enters the first prism 6a through the first light entrance surface S1 and exits through the second light exit surface S5 like the projection light L2 does; however, as shown in FIGS. 10A and 10B, the OFF light L3 does not enter the projection lens 7, since it exits with a large angular difference from the projection light L2.

FIGS. 10A and 10B shows how the ON light L2 and the OFF light L3 behave while traveling from the digital micromirror device DP to the projection lens 7. As shown in the figures, most of the OFF light L3 is guided into, and also out of, the prism unit 6, and then, processing of the OFF light L3 is performed at the light shielding plate 8, etc. In FIGS. 10A and 10B, the prism unit 6 is large enough to allow the OFF light L3 to pass therethrough without being cut in the prism unit 6, and in this manner, by preventing the OFF light L3 from scattering near the digital micromirror device DP and inside the prism unit 6 to become stray light, degradation of the contrast is prevented. The pupil position of the relay optical system 5 and the pupil position of the projection lens 7 are optically conjugate with each other, and an image of a stop aperture of the relay optical system 5 is formed likewise at the pupil position of the projection lens 7 as well.

Figure 11:
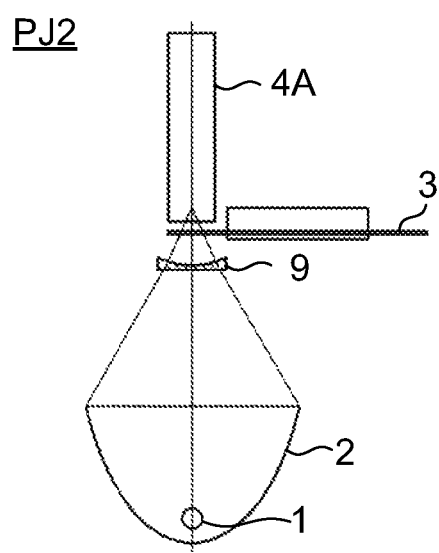
FIG. 11 is a main-part schematic diagram showing another specific example of image projection apparatus having the third-type illumination configuration.
Figure 14:
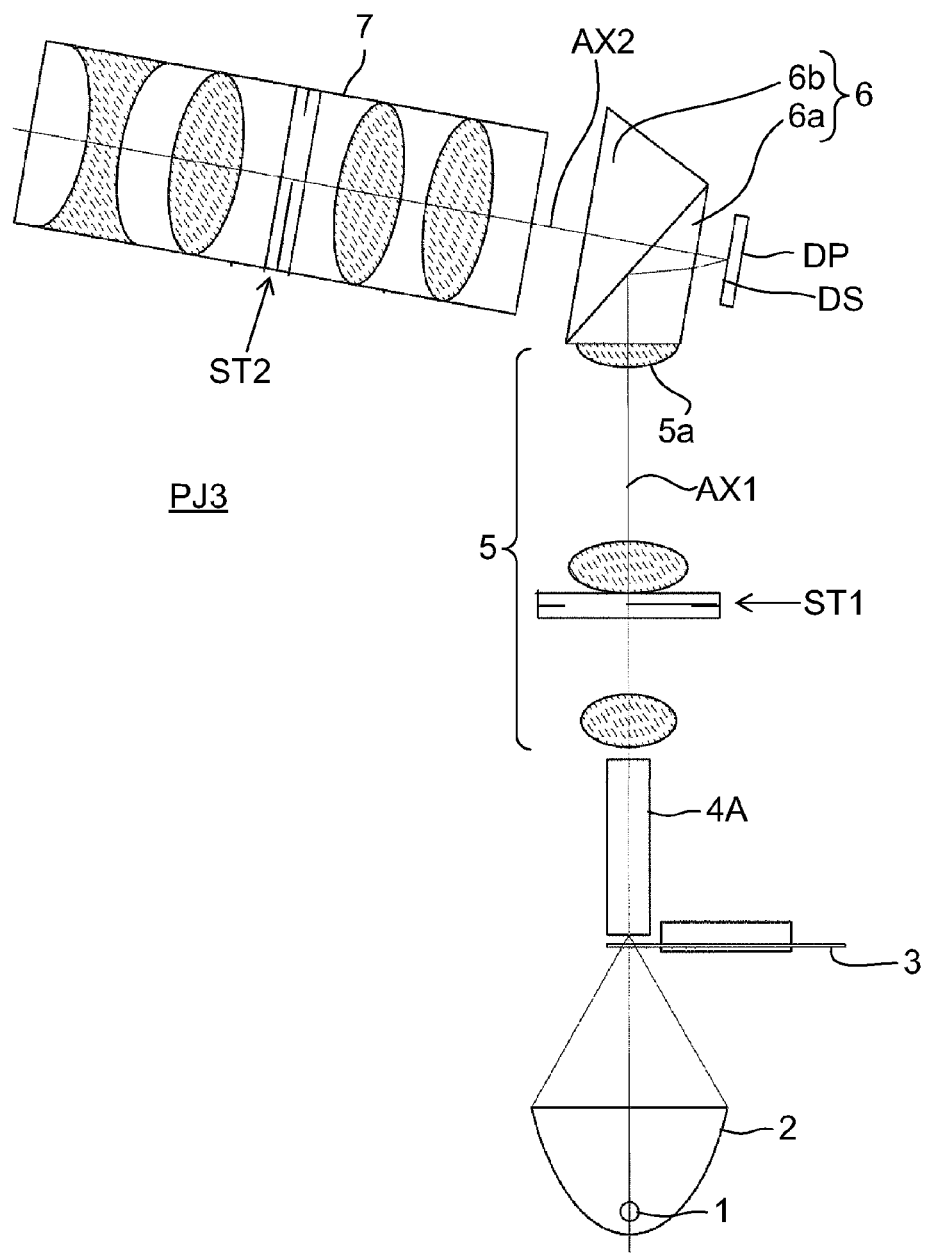
FIG. 14 is an optical configuration diagram showing an image projection apparatus having the fourth-type illumination configuration.

Table 1 shows contrast improving effect achieved with different shifting angles of the illumination light L1. The optical system assumed in Table 1 is one having an illumination system and a projection system F-numbers of which are both 2.5, and experiments were conducted with respect to pixel tilt angles β of 14°, 15°, 16°, 17°, and 18°. The F-number of a light beam is represented by $1/(2 \times \sin \Theta)$ (where Θ represents a one-side opening angle). F2.5 is approximately 11.5°. As the angle of the illumination system was shifted, the position of the light beam passing through the projection system was deviated with respect to the stop aperture of the projection system. Accordingly, an amount of the projection light was reduced, but the amount of, and the percentage of, such part of the illumination light L1 as sneaked into the back surface side of the pixel reflection surfaces MS and became stray light was also reduced, and thus it is clear the contrast was improved along with the shifting. Further, a smaller pixel tilt angle β helps improve the contrast by making the opening smaller through which light sneaks into the back surface side of the pixel reflection surfaces MS, and thus reducing the amount of stray light that sneaks into the back surface side of the pixel reflection surfaces MS. The first-type and second-type illumination configurations (FIG. 5 to FIG. 7C) described further above are also applicable to the image projection apparatus PJ1, and in such cases, a straight-shaped rod integrator may be used (FIG. 11, FIG. 14).

TABLE 1

| Pixel tilt angle β | | Illumination shift angle θ | | | |
|---|---|---|---|---|---|
| | | 0° | 2° | 4° | 6° |
| Illumination F2.5 circular stop (α = β − θ) ◯ | 14° | Projection light amount | 1.000 | 0.964 | 0.878 | 0.768 |
| | | Stray light amount | 0.124 | 0.104 | 0.084 | 0.067 |
| | | Stray light percentage | 12.4% | 10.7% | 9.5% | 8.7% |
| | 15° | Projection light amount | 1.000 | 0.967 | 0.881 | 0.776 |
| | | Stray light amount | 0.139 | 0.121 | 0.102 | 0.081 |
| | | Stray light percentage | 13.9% | 12.5% | 11.5% | 10.5% |
| | 16° | Projection light amount | 1.000 | 0.969 | 0.886 | 0.784 |
| | | Stray light amount | 0.157 | 0.140 | 0.119 | 0.098 |
| | | Stray light percentage | 15.7% | 14.4% | 13.5% | 12.5% |
| | 17° | Projection light amount | 1.000 | 0.969 | 0.891 | 0.796 |
| | | Stray light amount | 0.176 | 0.157 | 0.136 | 0.112 |
| | | Stray light percentage | 17.6% | 16.2% | 15.3% | 14.0% |
| | 18° | Projection light amount | 1.000 | 0.970 | 0.894 | 0.800 |
| | | Stray light amount | 0.195 | 0.175 | 0.153 | 0.130 |
| | | Stray light percentage | 19.5% | 18.0% | 17.1% | 16.2% |

It is desirable that the percentage of stray light, in other words, the percentage of the amount of illumination light that sneaks into the back surface side of the pixel reflection surfaces with respect to the amount of the illumination light incident on the pixel reflection surfaces be 17.5% or lower. This stray light percentage indicates the proportion of the amount of light reflected from the back surface side when all the pixel reflection surfaces are in the image non-displaying state.

Table 2 shows effects achieved by angle shifting performed in a case where the illumination light L1 is formed into a flat illumination light beam (FIG. 8). The projection system assumed in Table 2 is an F2.5 projection system, while the illumination system performs illumination by means of a tapered rod in a shifting direction at F4.2 with a narrow angular distribution width, and at F2.5 in a direction perpendicular to the shifting direction. Since a light beam width is narrowed in an angle shifting direction of the illumination optical axis AX1, a small-amount shift of angle does not reduce the projection light amount very much, and the amount of such part of the illumination light L1 as sneaks into the back surface side of the pixel reflection surfaces MS and becomes stray light is reduced. Thus, improved contrast is achieved with a smaller loss of brightness than in the case of Table 1. In view of contrast, it is further desirable that the percentage of stray light be 15% or lower.

TABLE 2

| Pixel tilt angle β | | Illumination shift angle θ | | | |
|---|---|---|---|---|---|
| | | 0° | 2° | 4° | 6° |
| Illumination F2.5 × F4.2 elliptical stop With tapered rod (α = β − θ) ◯ | 14° | Projection light amount | 0.915 | 0.915 | 0.911 | 0.873 |
| | | Stray light amount | 0.106 | 0.091 | 0.077 | 0.060 |
| | | Stray light percentage | 11.6% | 9.9% | 8.4% | 6.9% |
| | 15° | Projection light amount | 0.915 | 0.915 | 0.911 | 0.877 |
| | | Stray light amount | 0.121 | 0.106 | 0.090 | 0.074 |
| | | Stray light percentage | 13.2% | 11.6% | 9.9% | 8.5% |
| | 16° | Projection light amount | 0.915 | 0.915 | 0.911 | 0.882 |
| | | Stray light amount | 0.136 | 0.119 | 0.106 | 0.087 |
| | | Stray light percentage | 14.9% | 13.0% | 11.7% | 9.8% |
| | 17° | Projection light amount | 0.915 | 0.915 | 0.912 | 0.888 |
| | | Stray light amount | 0.153 | 0.137 | 0.120 | 0.102 |
| | | Stray light percentage | 16.7% | 14.9% | 13.2% | 11.5% |
| | 18° | Projection light amount | 0.915 | 0.915 | 0.912 | 0.891 |
| | | Stray light amount | 0.172 | 0.154 | 0.135 | 0.117 |
| | | Stray light percentage | 18.8% | 16.8% | 14.8% | 13.1% |

FIG. 11 shows a main part of another specific example of the third-type illumination configuration. In the illumination configuration shown in FIG. 11, to achieve illumination with a flat angular distribution, a rod integrator 4A, which is not tapered but straight shaped, and a cylindrical lens 9 are used instead of the tapered rod integrator 4 (FIG. 9). The cylindrical lens 9, which has a flat surface and a concave surface, converges a light beam onto a light entrance surface of the rod integrator 4A at a smaller convergence angle in a long-side direction of the light entrance surface, and thereby narrows the angular distribution width in that direction.

Thus, according to an image projection apparatus PJ2 (FIG. 11) having the present illumination configuration, as in the image projection apparatus PJ1 and the like described above, a reduced proportion of illumination light L1 sneaks into the back surface side of the pixel reflection surfaces MS to become stray light, and this helps improve the contrast. The direction in which the angular distribution width is narrowed by the cylindrical lens is perpendicular to the direction in which the projection light and the illumination light are separated.

Figure 12A:
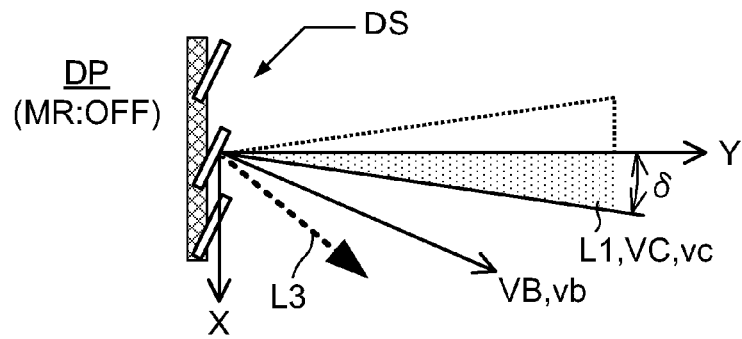
FIGS. 12A, 12B, and 12C are optical configuration diagrams showing a fourth-type illumination configuration with the pixel reflection surfaces in the OFF state.
Figure 12B:
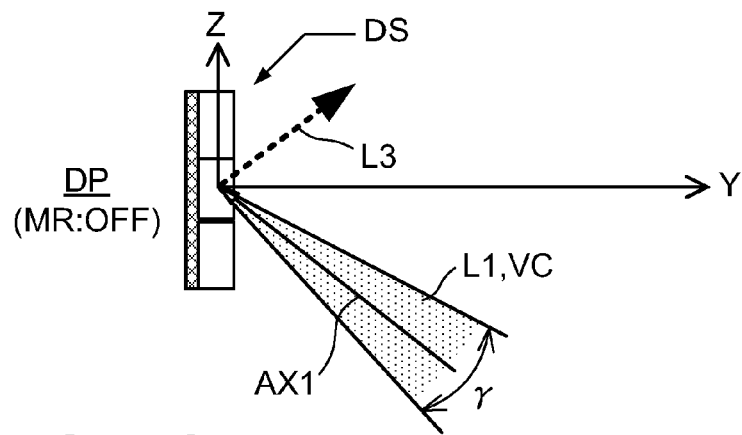
Figure 12C:
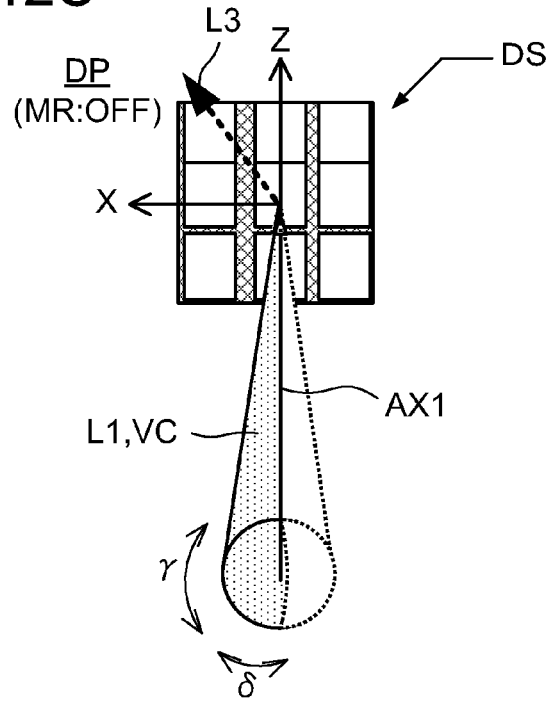
Figure 13:
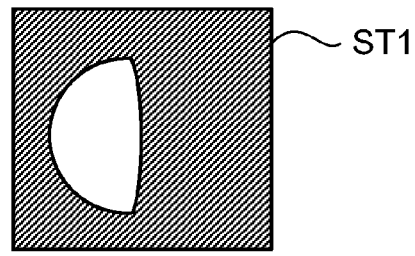
FIG. 13 is a plan view showing a stop member used in the fourth-type illumination configuration.

FIGS. 12A, 12B, and 12C show the OFF state of the micromirrors MR in a fourth-type illumination configuration. FIGS. 12A, 12B, and 12C are a top view, a side view, and a front view, respectively, showing the illumination light L1, the OFF light L3, and the like when the micromirrors MR are in the OFF state. FIG. 13 shows a stop member that helps achieve the fourth-type illumination configuration, and FIG. 14 shows an image projection apparatus PJ3 having the fourth-type illumination configuration (FIGS. 12A, 12B, and 12C).

The fourth-type illumination configuration is configured such that, as shown in FIGS. 12A, 12B, and 12C, an irregular-shaped illumination-system stop ST1 (FIG. 13) cuts such part of a light beam of illumination light L1 as is at an incident angle that allows the illumination light L1 to easily sneak into the mirror back surface side. That is, the fourth-type illumination configuration includes, as the illumination-system stop ST1 (FIG. 13), an irregular-shaped aperture stop having a noncircular shape at least partly cuts such part of the illumination light L1 incident on the pixel reflection surfaces MS as is on the side with respect to the Y axis where the projection vb (FIGS. 12A, 12B, and 12C) does not exist (FIG. 14). Furthermore, the fourth-type illumination configuration is configured such that the projection system includes, as a projection-system stop ST2 (FIG. 13), an irregular-shaped aperture stop that is conjugate with, and similar in shape to, the illumination-system stop ST1 (FIG. 14).

The image projection apparatus PJ3 (FIG. 14) is characterized by having the D-cut-shaped stops ST1 and ST2 in the projection system and the illumination system, respectively, and in the other respects, the image projection apparatus PJ3 is configured in approximately the same manner as the image projection apparatuses PJ1, PJ2 (FIG. 9, FIG. 11). The configuration is such that the pupil position of the relay optical system 5 in the illumination system and the pupil position of the projection lens 7 are in an optically conjugate relationship to each other, and the projection lens 7 is provided with the projection-system stop ST2, which has a D-cut shaped aperture similar in shape to the D-cut shaped aperture of the illumination-system stop ST1. The configuration makes it possible to improve the contrast by cutting, by means of the D-cut shaped illumination-system stop ST1, such part of the illumination light beam L1 as is incident on the digital micromirror device DP at an incident angle at which the illumination light beam L1 easily sneaks into the back surface side of the pixel reflection surfaces MS. Furthermore, by providing the illumination system and the projection system with the stops ST1 and ST2, respectively, of the apertures which are similar to each other in shape, it is also made possible to optimize the contrast.

The illumination-system stop ST1 determines the shape of the projection light beam L2 at the position of the projection-system stop ST2. At this time, if the aperture of the projection-system stop ST2 is larger than a cross section of the projection light beam at the stop position, there is no loss of the projection light beam. However, the aperture is also large when stray light scattered by the micromirrors MR in the OFF state passes through the projection lens 7, and thus the contrast is degraded. On the other hand, if the aperture of the projection-system stop ST2 is smaller than the cross section of the projection light beam at the stop position, the aperture is also small when stray light scattered by the micromirrors MR in the OFF state passes through the projection lens 7, and thus a reduced amount of stray light passes through the projection lens 7. However, the amount of projection light L2 in the ON state that passes through the projection lens 7 is also reduced largely, and thus not much improving effect can be obtained. Thus, it is desirable that the aperture of the projection-system stop ST2 have a shape optically conjugate with, and similar in shape to, the aperture of the illumination-system stop ST1.

In the case of the illumination configuration shown in Table 2, the illumination system may be provided with an F2.5×F4.2 stop having an elliptical aperture, and the projection system may be provided with a stop having an elliptical aperture optically conjugate with the stop provided in the illumination system. In that case, the stop aperture in the projection lens 7 is eccentric with respect to the angle shift amount.

In the image projection apparatuses having the above-described illumination configurations, it is assumed that one digital micromirror device DP is used, but those illumination configurations may be applied to an image projection apparatus that performs color-separation of light into illumination light beams of three RGB colors, performs display of images of the three RGB colors on three digital micromirror devices DP corresponding to the respective colors, and performs color-combination with respect to the images of the three RGB colors to project a resulting image onto a screen.

LIST OF REFERENCE SIGNS

PJ1, PJ2, PJ3 image projection apparatus
DP digital micromirror device (reflection-type image display element)
DS image display surface
MR micromirror
MS pixel reflection surface
ST1 illumination-system stop
ST2 projection-system stop
L1 illumination light
L2 ON light (projection light, necessary light)
L3 OFF light (unnecessary light)
AX1 illumination optical axis
AX2 projection optical axis
1 lamp light source
2 reflector (illumination system)
3 color wheel (illumination system)
4, 4A rod integrator (illumination system)
5 relay optical system (illumination system)
6 prism unit (optical path separation system)
7 projection lens (projection system)
8 light shielding plate
9 cylindrical lens Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An image projection apparatus comprising:
a reflection-type image display that forms an image by modulating intensity of illumination light by causing, in an image display surface composed of a plurality of pixel reflection surfaces, each of the pixel reflection surfaces to switch between two angular states, which are an image display state and an image non-display state,
wherein
the projection vb is at a predetermined angle not parallel to the Y axis when:
   a normal vector of the pixel reflection surfaces in the image display state is represented by VA,
   a normal vector of the pixel reflection surfaces in the image non-display state is represented by VB,
   a Y axis is set in a normal direction of the image display surface, with a pixel center as an origin,
   an X axis is set in a direction perpendicular to the Y axis and the normal vector VA, and
   a projection of the normal vector VB onto an XY plane is represented by vb; and
among projections of illumination light incident on the pixel reflection surfaces onto the XY plane, a projection that forms a maximum angle with respect to the Y axis exists only on a side with respect to the Y axis where a region in which the projection vb exists lies.

2. The image projection apparatus according to claim 1, wherein
a relationship of $\gamma>\delta$ is satisfied when:
   a Z axis is set in a direction perpendicular to the X axis and the Y axis,
   a plane that includes an illumination optical axis of illumination light incident on the pixel reflection surfaces and the Z axis is represented by plane HD,
   a plane that includes the illumination optical axis and is perpendicular to the plane HD is represented by plane HE,
   an angular distribution width of illumination light within the plane HD is represented by $\gamma$, and
   an angular distribution width of illumination light within the plane HE is represented by $\delta$.

3. The image projection apparatus according to claim 1, further comprising:
an illumination system that guides illumination light to the image display surface; and
a projection system that projects an image displayed on the image display surface.

4. The image projection apparatus according to claim 3, wherein
the illumination system includes an irregular-shaped aperture stop that has a noncircular shape and at least partly cuts such part of illumination light incident on the pixel reflection surfaces as is on a side with respect to the Y axis where the projection vb does not exist.

5. The image projection apparatus according to claim 4, wherein
the projection system includes an irregular-shaped aperture stop that is conjugate with, and substantially identical in shape to, the irregular-shaped aperture stop of the illumination system.

6. The image projection apparatus according to claim 1, wherein
a percentage of an amount of illumination light that sneaks into a back surface side of the pixel reflection surfaces with respect to an amount of the illumination light incident on the pixel reflection surfaces is 17.5% or lower.

7. An image projection apparatus comprising:
a reflection-type image display that forms an image by modulating intensity of illumination light by causing, in an image display surface composed of a plurality of pixel reflection surfaces, each of the pixel reflection surfaces to switch between two angular states, which are an image display state and an image non-display state,
wherein
the projection vb is at a predetermined angle not parallel to the Y axis when:
   a normal vector of the pixel reflection surfaces in the image display state is represented by VA,
   a normal vector of the pixel reflection surfaces in the image non-display state is represented by VB,
   a Y axis is set in a normal direction of the image display surface, with a pixel center as an origin,
   an X axis is set in a direction perpendicular to the Y axis and the normal vector VA, and
   a projection of the normal vector VB onto an XY plane is represented by vb; and
a relationship of $\alpha<\beta$ is satisfied when:
   an illumination optical axis vector of illumination light incident on the pixel reflection surfaces is represented by VC,
   a projection of the vector VC onto the XY plane is represented by vc,
   an angle formed by the projection vb and the projection vc is represented by $\alpha$, and
   an angle formed by the Y axis and the projection vb is represented by $\beta$.

8. The image projection apparatus according to claim 7, wherein
a percentage of an amount of illumination light that sneaks into a back surface side of the pixel reflection surfaces with respect to an amount of the illumination light incident on the pixel reflection surfaces is 17.5% or lower.

9. The image projection apparatus according to claim 7, wherein a relationship of $\gamma>\delta$ is satisfied when:
   a Z axis is set in a direction perpendicular to the X axis and the Y axis,
   a plane that includes an illumination optical axis of illumination light incident on the pixel reflection surfaces and the Z axis is represented by plane HD,
   a plane that includes the illumination optical axis and is perpendicular to the plane HD is represented by plane HE,
   an angular distribution width of illumination light within the plane HD is represented by $\gamma$, and
   an angular distribution width of illumination light within the plane HE is represented by $\delta$.

10. The image projection apparatus according to claim 7, further comprising:
an illumination system that guides illumination light to the image display surface; and
a projection system that projects an image displayed on the image display surface.

11. The image projection apparatus according to claim 10, wherein
the illumination system includes an irregular-shaped aperture stop that has a noncircular shape and at least partly cuts such part of illumination light incident on the pixel reflection surfaces as is on a side with respect to the Y axis where the projection vb does not exist.

12. The image projection apparatus according to claim 11, wherein the projection system includes an irregular-shaped aperture stop that is conjugate with, and substantially identical in shape to, the irregular-shaped aperture stop of the illumination system.

* * * * *